(12) United States Patent
Sadana et al.

(10) Patent No.: US 8,918,094 B2
(45) Date of Patent: *Dec. 23, 2014

(54) SYSTEMS AND METHOD FOR MEDIA TRANSFER

(71) Applicant: Cellco Partnership, Basking Ridge, NJ (US)

(72) Inventors: Rajeev Sadana, Green Brook, NJ (US); Carlos A. Cazanas, Bethlehem, PA (US); Victor Pagan, Breinigsville, PA (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/973,503

(22) Filed: Aug. 22, 2013

(65) Prior Publication Data

US 2013/0337798 A1    Dec. 19, 2013

Related U.S. Application Data

(63) Continuation of application No. 12/763,739, filed on Apr. 20, 2010, now Pat. No. 8,521,150.

(51) Int. Cl.
| | |
|---|---|
| *H04M 3/00* | (2006.01) |
| *H04N 21/254* | (2011.01) |
| *H04N 21/258* | (2011.01) |
| *G06F 21/10* | (2013.01) |
| *H04W 4/00* | (2009.01) |
| *H04W 4/12* | (2009.01) |
| *H04L 29/08* | (2006.01) |
| *H04W 8/18* | (2009.01) |

(52) U.S. Cl.
CPC ........... *H04W 4/003* (2013.01); *H04N 21/2541* (2013.01); *G06F 2221/0791* (2013.01); *H04N 21/25875* (2013.01); *H04N 21/25816* (2013.01); *G06F 21/10* (2013.01); *H04W 4/12* (2013.01); *H04L 67/06* (2013.01); *H04W 8/18* (2013.01)
USPC ...... 455/419; 455/422.1; 455/411; 455/412.1; 455/414.2; 455/420; 726/27; 726/28; 726/30

(58) Field of Classification Search
CPC .. H04M 3/00; G06F 2009/00; G06F 2009/30; G06F 2009/06; G06F 2003/00; G06L 51/10; G06L 51/18; G06L 51/24
USPC ............. 455/411, 412.1–412.2, 414.1–414.3, 455/417–420, 550.2, 466; 380/270, 277; 726/26, 27, 28
See application file for complete search history.

(56) References Cited

U.S. PATENT DOCUMENTS 7,814,560 B2 * 10/2010 Bellagamba et al. ........... 726/28
7,869,602 B1 *  1/2011 Faros et al. .................... 380/277
(Continued)

OTHER PUBLICATIONS

Entire prosecution history of U.S. Appl. No. 12/763,739, filed Apr. 20, 2010, entitled "Systems and Method for Media Transfer," now U.S. Patent No. 8,521,150, issued Aug. 27, 2013.

*Primary Examiner* — Babar Sarwar

(57) ABSTRACT

Components of a mobile traffic network and components in communication with the network cooperate to confirm whether a mobile station user or account owner has previously purchased media content for a particular mobile station. Media content that has already been purchased by a user can be downloaded by that user to a new mobile station after the initial mobile station is lost, damaged, or upgraded.

17 Claims, 3 Drawing Sheets

(56) References Cited

U.S. PATENT DOCUMENTS

| | | | |
|---|---|---|---|
| 7,974,614 B1 * | 7/2011 | Soelberg et al. | 455/420 |
| 7,984,506 B2 * | 7/2011 | Ueno et al. | 726/26 |
| 8,068,861 B1 * | 11/2011 | Kupsh et al. | 455/466 |
| 8,616,449 B2 * | 12/2013 | Mesaros | 235/383 |
| 2005/0070248 A1 | 3/2005 | Gaur | |
| 2008/0139112 A1 * | 6/2008 | Sampath et al. | 455/3.04 |
| 2008/0214163 A1 | 9/2008 | Onyon et al. | |
| 2009/0156181 A1 * | 6/2009 | Athsani et al. | 455/414.2 |
| 2010/0062745 A1 * | 3/2010 | Silk | 455/411 |

* cited by examiner

SYSTEMS AND METHOD FOR MEDIA TRANSFER

RELATED APPLICATIONS

This application is a continuation and claims the benefit of U.S. application Ser. No. 12/763,739 Filed Apr. 20, 2010 entitled "SYSTEMS AND METHOD FOR MEDIA TRANSFER," now U.S. Pat. No. 8,521,150, the disclosure of which is entirely incorporated herein by reference.

BACKGROUND

As mobile station processing power continues to increase along with the speed at which media content (e.g., software applications and/or media such as ringtones, music, video, etc.) can be downloaded over-the-air, mobile network providers are offering more and more media content for use by the end-users of mobile stations. As the catalogs of media content continue to grow, it becomes increasingly common for end-users to purchase media content that may be of interest to them and to download such media content to a particular mobile station.

Often a user spends significant time and money purchasing mobile device media content for a particular mobile station. In the event that the mobile station is lost or damaged or the user desires to upgrade or replace the mobile station, the user typically has to remember which media content was previously purchased for the initial device and then repurchase the media content for the replacement or upgraded device. Thus, the user may not accurately remember all media content that was on the initial mobile station, and may be forced to pay twice for the media content that is remembered.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF EXAMPLES

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Functionality, systems, and methods for transferring mobile station media to a mobile station are shown and described. By use of such, the end-user of a mobile station, e.g., a cell phone customer, can transfer already purchased media content from one mobile station to another mobile station, such as a replacement, e.g., a certified like-new replacement (CLNR) or upgraded mobile station. Thus, the end-user can replace at no cost media content that has already been purchased for a particular mobile station, e.g., one that has been lost, damaged, or upgraded.

Figure 1:
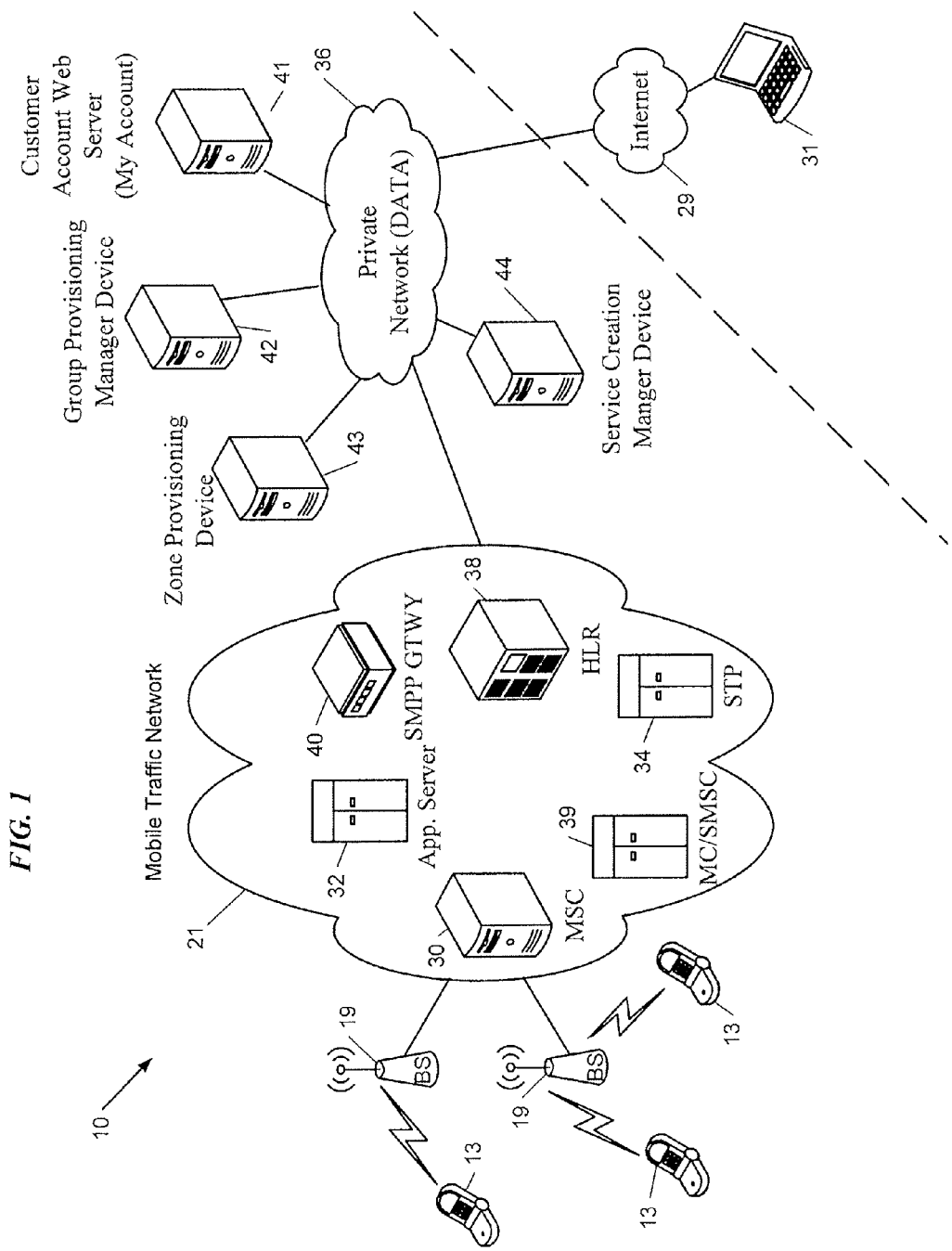
FIG. 1 is a functional block diagram that depicts various components of an exemplary mobile communications network.

Reference now is made in detail to the examples illustrated in the accompanying drawings and discussed below. FIG. 1 illustrates a mobile communication network 10 as may be operated by a carrier or service provider to provide a wide range of mobile communication services and ancillary services or features to its subscriber customers and associated mobile station (MS) users. The elements collectively indicated by the reference numeral 10 generally are elements of the network and are operated by or on behalf of the carrier, although the mobile stations may be sold to and owned by the carrier's customers. The mobile communication network 10 provides communications between mobile stations as well as communications for the mobile stations with networks and stations (not shown) outside the mobile communication network 10.

The wireless mobile communication network 10 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile stations 13 may be capable of conventional voice telephone communications and data communications.

For purposes of later discussion, several mobile stations 13 appear in the drawing, to represent examples of the mobile stations that may receive various services via the mobile communication network 10. For example, the mobile stations 13 can receive and execute applications or other media content written in various programming languages.

Mobile stations 13 can take the form of portable handsets, smart-phones or personal digital assistants, although they may be implemented in other form factors The media content can be configured to execute on many different types of mobile stations 13. For example, a mobile station application can be written to execute on a binary runtime environment for mobile (BREW-based) mobile station. In further instances, a mobile station application can be written to execute on a Windows Mobile based mobile station, Android, I-Phone, Java Mobile, or RIM based mobile station such as a Black-Berry or the like. These types of devices can employ a multi-tasking operating system.

The mobile station 13 allows the end-user to select the media content for download to the mobile station. For example, the end-user can receive a messaging service message (e.g., a SMS message) from various network elements or components in communication with the mobile communications network cooperate to transmit and download desired media content for use on the mobile station(s) 13.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13, can include one or more RANs and a regional circuit and/or packet switched network and associated signaling network facilities.

Physical elements of a RAN operated by one of the mobile service providers or carriers, include a number of base stations represented in the example by the base stations (BSs)

19. Although not separately shown, such a base station 19 can include a base transceiver system (BTS), which can communicate via an antennae system at the site of base station and over the airlink with one or more of the mobile stations 13, when the mobile stations are within range. Each base station can include a BTS coupled to several antennae mounted on a radio tower within a coverage area often referred to as a "cell." The BTS is the part of the radio network that sends and receives RF signals to/from the mobile stations 13 that are served by the base station 19.

The radio access networks can also include a traffic network represented generally by the cloud at 21, which carries the user communications and data for the mobile stations 13 between the base stations 19 and other elements with or through which the mobile stations communicate. In some examples, the mobile traffic network 21 includes network elements that support mobile station media content transfer services such as mobile switching centers (MSCs) 30, signal transfer points (STP) 34, and an application server (App. Server) 32. The network can also include other elements that support functionality other than media content transfer services such as messaging service messages and voice communications. Examples of other network elements that may be used in support of messaging service message communications include, but are not limited to, message centers (MCs) 39, home location registries (HLRs) 38, simple messaging service point-to-point (SMPP) gateway 40, and other network elements such as wireless internet gateways (WIGs), and visitor location registers (VLRs) (not shown). Other individual elements such as switches and/or routers forming the traffic network 21 are omitted here form simplicity. It will be understood that the various network elements can communicate with each other and other aspects of the mobile communications network 10 and other networks (e.g., the public switched telephone network (PSTN) and the Internet) either directly or indirectly.

The mobile switching center (MSC) 30 is responsible for managing communications between the mobile station and the other elements of the network 10. In addition, the MSC 30 is responsible for handling voice calls and messaging service message requests as well as other services (such as conference calls, FAX and circuit switched data, messaging service communications, Internet access, etc.). The MSC 30 sets up and releases the end-to-end connection or session, and handles mobility and hand-over requirements during the call. The MSC 30 also routes messaging service messages to/from the mobile stations 13, typically from/to an appropriate MC 39. The MSC 30 is sometimes referred to as a "switch". The MSC 30 manages the cell sites, the voice trunks, voicemail, and SS7 links.

The message center (MC) 39, in some examples, allows messaging service messages to be exchanged between mobile telephones and other networks. For SMS messaging, for example, the MC 39 receives packet communications containing text messages from originating mobile stations and forwards the messages via the signaling resources and the signaling channels to the appropriate destination mobile stations. The MC 39 may receive messages from external devices for similar delivery to mobile stations, and the MC 39 may receive similar messages from the mobile devices and forward them to servers or terminal devices, in either case, via an Internet Protocol (IP) packet data network.

In some examples, the MC 33 can also be considered or include functionality that may be considered that of a Short Messaging Service Message Center (SMSC) or a Message Register (MR). Wireless carriers developed the short message service (SMS) to transmit text messages for display on the mobile stations. In many existing network architectures, the SMS traffic uses the signaling portion of the network 21 to carry message traffic between a Short Message Service Center (SMSC) 39 and the mobile stations. The SMSC 39 supports mobile station to mobile station delivery of text messages. However, the SMSC 39 also supports communication of messages between the mobile stations and devices coupled to other networks. For example, the SMSC 39 may receive incoming IP message packets from the Internet 29 for delivery via the network 21, one of the base stations 19 and a signaling channel over the air link to a destination mobile station. For this later type of SMS related communications, the network 10 also includes one or more Short Message Peer-to-Peer (SMPP) protocol gateways 40.

In other examples, the MC 39 can include functionality related to the Enhanced Messaging Service (EMS) or Multimedia Messaging service (MMS). An EMS message can have special text formatting (e.g., such as bold or italic), animations, pictures, icons, sound effects and special ring tones. MMS messages support the sending and receiving of multimedia messages (e.g., images, audio, video and their combinations) to (or from) MMS-enabled mobile stations. In some examples, the MC 39 can be considered in whole or in part a multimedia messaging service center (MMSC).

Although a single MC 39 is shown, a network 10 can have many geographically dispersed MCs 39. The MCs 39 can include destination routing tables (DRTs). In essence the DRTs are databases within the MCs 39. A DRT contains a list of the MDNs which are associated with the various MCs 39. For example, a first MDN is associated with a MC 39 in Minn. while a second MDN is associated with a MC 39 in Va. The DRTs are used to determine which MC 39 should attempt to deliver an incoming messaging service message to the destination MDN. For example, if a user associated with the MC in Minn. sends a SMS to a user associated with the MC 39 in Va., the Minn. MC 39 sends the SMS to the Va. MC 33 for delivery to the destination MDN. The communication among the MCs 39 occurs using know protocols such SMPP and the like.

The HLR 38, in some examples, stores a subscriber profile for each of the wireless subscribers and their associated mobile stations 13, 15, and 17. The HLR 38 may reside in an MSC 30 or in a centralized service control point that communicates with the MSC(s) 34 via an out-of-band signaling system such as an SS7 network. The HLR 38 stores for each mobile subscriber the subscriber's mobile directory number (MDN), the mobile identification number (MIN), and information specifying the wireless services subscribed to by the mobile subscriber, such as numeric paging or text-based paging, data communication services, etc. Of course, the HLR 38 can also be a stand-alone device. The HLR also tracks the current point of attachment of the mobile station to the network, e.g., the identification of the MSC 30 with which the mobile station is currently registered to receive service.

The visitor location register (VLR) (not shown) is, in some examples, a temporary database of the mobile stations that have roamed into the particular area which it serves. The VLRs for a region often are implemented in or in association with a MSC 30. Each base station 19 in the network is served by a single VLR, hence a subscriber cannot be present in more than one VLR at a time. The data stored in the VLR has either been received from the HLR 38, or collected from the mobile station.

The SMPP gateway 40 provides functionality to transport messaging service messages to other mobile communication networks and also receive messaging service messages from other networks. The SMPP gateway 34 supports communications using the SMPP protocol. SMPP gateways 40 are Short Message Peer-to-Peer (SMPP) gateways 40 used to connect the wireless communication network (such as an Internal Protocol IP network on the left of the SMPP Gateway 40 in FIG. 1) to another network (such as a public Internet network on the right of the SMPP Gateway 40 in FIG. 1). The SMPP Gateway 40 allows the MC 39 to receive and send messages in IP packet format. The SMPP Gateway 40 is an entity within the wireless network 10 that acts as an intermediary between the wireless service provider network and other networks. For example, the SMPP Gateway 40 converts messages in protocol(s) used by other applications and devices, e.g. Extensible Markup Language (XML), Hypertext Mail Protocol (HTMP), etc., to and from the SMPP protocol. The SMPP messages ride on IP transport, e.g., between the SMPP Gateway 40 and the MC 39.

In addition, the traffic network portion 21 of the mobile communications network 10 connects to a private data network 36. The private data network 36 connects to the traffic network portion 21 via a gateway (not shown). The gateway can provide protocol conversions between the protocols used by the traffic network 21 and the protocols used by the private data network 36.

The private data network 36 can be in communication with various auxiliary services servers, e.g., such as those providing additional services to the users of the network 10, and/or to operations support personnel of the service provider or carrier that operates the network 10. For example, the carrier can also offer its subscribers on-line access to a variety of functions related to the subscribers' accounts, such as review of billing statements and usage data, on-line payment, subscription changes, password control or the like. For that purpose, the carrier can operate a customer account web server 41, offering a "MyAccount" type subscriber interface via the Internet, e.g., a "My Verizon" page for a user having a Verizon Wireless account. Hence, a user's terminal, such as PC 31, may be used to access on-line information about a subscriber's account, which the mobile carrier makes available via the carrier's MyAccount web site accessible through the Internet 29.

In addition, a group provisioning manager device (GPMD) 42, a zone provisioning device (ZPD) 43, and a service creation manager device (SCMD) 44 can be provided in communication with the private data network 36 media content transfer functions, e.g., downloading of media content. The GPMD 42 can also be referred to as a group provisioning manager network device. For discussion purposes, each of the GPMD 42, ZPD 43, and SCMD 44 can be a stand-alone computing device such as a server. The functionality described below with respect to each of the GPMD 42, ZPD 43, and SCMD 44 can, however, be provided by one or multiple different computing devices. In other words, the GPMD 42, ZPD 43, and SCMD 44 need not be stand-alone computing devices in various configurations.

The SCMD 44 maintains provisioning information (e.g., previously purchased media content) for a particular end user and mobile station 13. The SCMD can also maintain information about the prices for various media content. For example, previously purchased media content can have a catalog price set to zero dollars ($0), to reflect the user already having purchased such media content. The SCMD 44 can communicate the provisioning information to the GPMD 42 and vice versa. Prices can vary according to mobile station make, model, and operating system. Of course, other parameters can affect pricing.

During the media transfer process for a mobile device, the GPMD 42 coordinates and controls various actions within the process. For example, the GPMD 42 communicates with the SCMD 44 via the private network 36 to gather and confirm various provisioning information (e.g., information about previously purchased media content) for a particular end user and mobile station 13. For example, GPMD 42 can perform or control an authorization-accounting (AAA) check, e.g., at a LDAP server (not shown), to ensure that a given user is authorized to receive media content before download or provisioning occurs.

Based on the confirmed results, the GPMD 42 transmits provisioning information related to the user's mobile station to the ZPD 43. The provisioning information can include previously purchased media content for the particular end user and mobile station 13. In turn, the ZPD 43 prepares, by communicating with the application server 32, the various versions of the replacement media content for transmission to the mobile station. The provisioning information can include items such as the price of the media content, the network address of the application server 32, and other information. After completing the provisioning of the replacement media content, e.g., application(s) and/or media, the ZPD 43 notifies the GPMD 42.

In response, the GPMD cooperates with the network elements of the mobile traffic network 21 to transmit a SMS message with download instructions to the user. Of course, an EMS or MMS message can also be used. The end-user of the mobile station can then execute the download instructions to download the media content to the particular mobile station 13 from the application server 32.

As outlined above, the example utilizes SMS type messaging transport through the network 10 to instruct a user on how to download previously purchased media content to a new mobile station 13, e.g., to a certified like new replacement device or an upgraded device. A SMS message includes source and destination address fields. For messages from a user device, the source address is the MDN of the sending customer's mobile station. For example, a SMS message sent from a mobile station 13 includes the MDN of the mobile station 13 as the identifier of the source of the message. The destination address may be a MDN of a destination station 13 or some other form of recognizable address. Of note for purposes of this discussion of media content transfer, one type of alternative address is a short code, typically four, five, six, eight, or twelve digits. The network 10 routes a SMS message with a MDN destination address all the way through to the addressed mobile station 13, however, the network 10 routes a SMS message with a short code destination address to a service provider application corresponding to the short code.

SMS routing thus allows use of short codes as a mechanism to route messages to/from a service provider, as opposed to communication of messages between end user devices. For this purpose, the short code is recognized by a control application in the network as being a message to a service provider as opposed to a message between SMS user devices, and the control application translates the short code to direct the message to the appropriate service provider platform. Depending on the service, the application may process the message, e.g., to count votes; or the network application may translate the short code to a destination address, e.g., an IP address of an external customer's server, such as the ESME server of a VASP.

For examples in accordance with FIG. 1, the group provisioning manager device 42 would have an assigned terminated or short code. Hence, the SMSC 39 routes outgoing messages received through the mobile network 10 from mobile stations like 13, which have a short code for the message destination address of the group provisioning manager device 42, through the network 36 to that device 42. Each such incoming message would include the MDN of an identified mobile station 13, and the SMSC and other elements of the network 21 would deliver the SMS message to the appropriate station based on the MDN as the message destination address.

Figure 2:
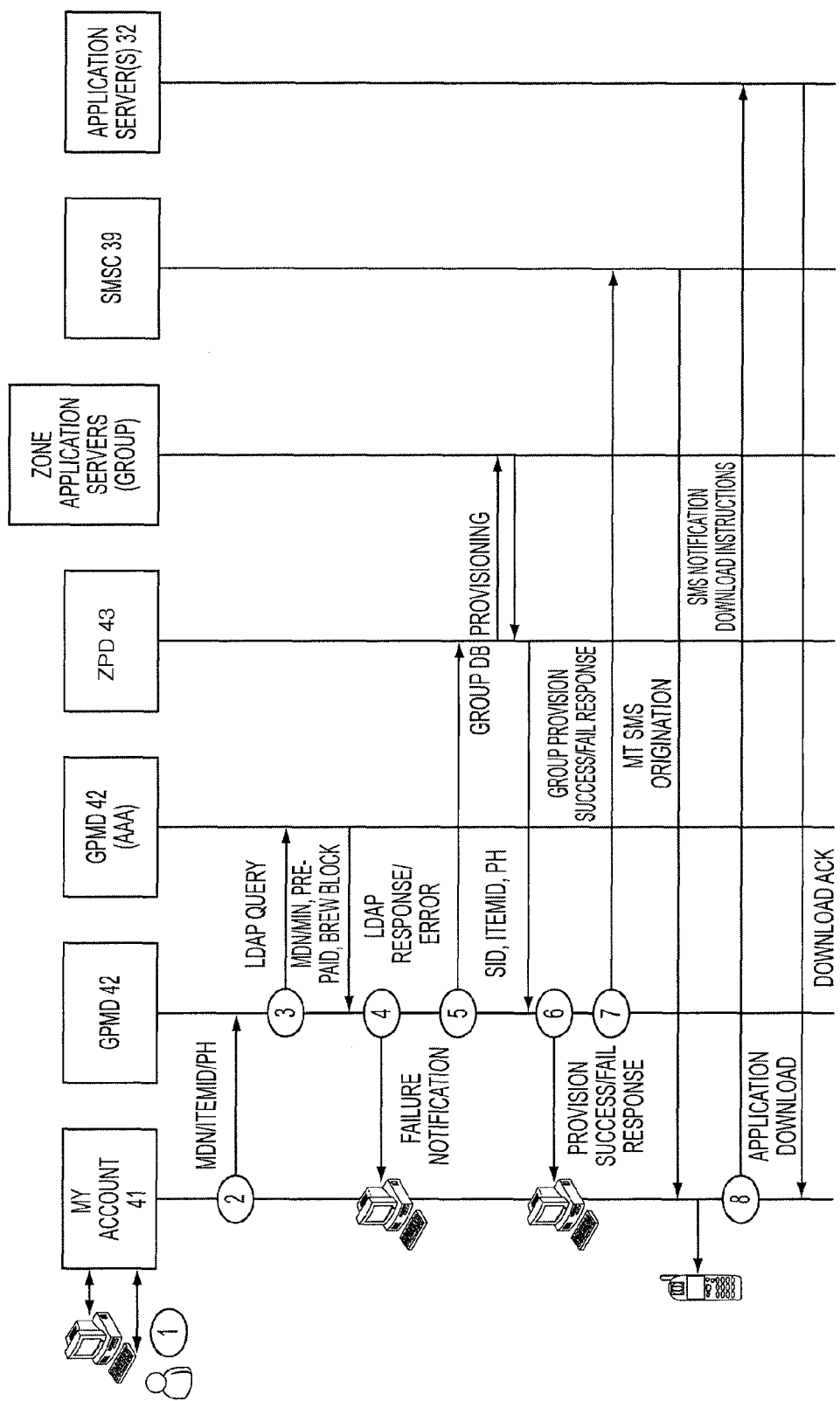
FIG. 2 is a flowchart showing various aspects of a media transfer for mobile stations.

With reference to FIG. 2, a method of enabling an end-user of a mobile station, e.g., a cell phone customer, to transfer their already purchased media content to another mobile station, such as a replacement or upgraded mobile station 13 is shown and described. The method begins with the user signing on to the user's account as accessed through connection with the customer account web server 41 and selecting the media content to be transferred to a new mobile station 13, e.g., as indicated at S1. For example, a user could sign on to Web site associated with the user's mobile station account, e.g., a "My Verizon" page for a Verizon Wireless account, and then select "My Media Retrieval." In response, the SCMD 44 can capture provisioning events along with user information corresponding to the user and mobile station 13 and send such to the GPMD 42, e.g., as indicated at S2, for provisioning for the user's new mobile station 13. The provisioning data can include a zero-dollar ($0) catalog price for already-provisioned media content.

The GPMD 42, after receiving the provisioning information from the SCMD 44 can query a network server such as a LDAP server as part of an authentication-authorization-accounting (AAA) process, e.g., as indicated at S3, to confirm or deny the user's authorization to access the selected media content, e.g., as indicated at S4. A query to a LDAP server can include a MDN/MIN, information about billing, e.g., prepaid, and/or the type of environment or platform the media content is configured to run on, e.g., BREW. A failure notification can be sent by the GPMD 42 in instances where there is inquiry error, e.g., LDAP response error.

In response to user confirmation, the GPMD 42 can send instructions (e.g., SID, ItemID, PH) for provisioning selected mobile station media content (e.g., the user's selected previously purchased media content as selected in S1) to the ZPD 43, e.g., as a folder indicated in a network database accessible through the user's account) to access and download, e.g., as indicated at S5. The ZPD 43 can communicate with one or more zone servers (not shown) such as zone Web User Interface (WebUI) server and zone application servers, and/or application server 32. Results of the provisioning (e.g., success or failures notices) can also be sent to the user by way of the user's MyAccount on PC 31, e.g., as indicated at S6.

Once the newly provisioned media content has been sent to the user's folder in the network database (e.g., a zone server). the GPMD 42 can send a SMS message to the user's mobile station 13 with instructions for downloading the media content to the user's mobile station, e.g., as indicated at S7.

The user can then download the media content, e.g., by launching an appropriate program from the mobile station 13 or otherwise querying the application download server (ADS) 32, e.g., as indicated at S8. Other actions can be taken as well. For example, one or more download acknowledgements can be sent from the ADS server to the user's mobile station 13 and/or PC 31.

Figures 3, 4:
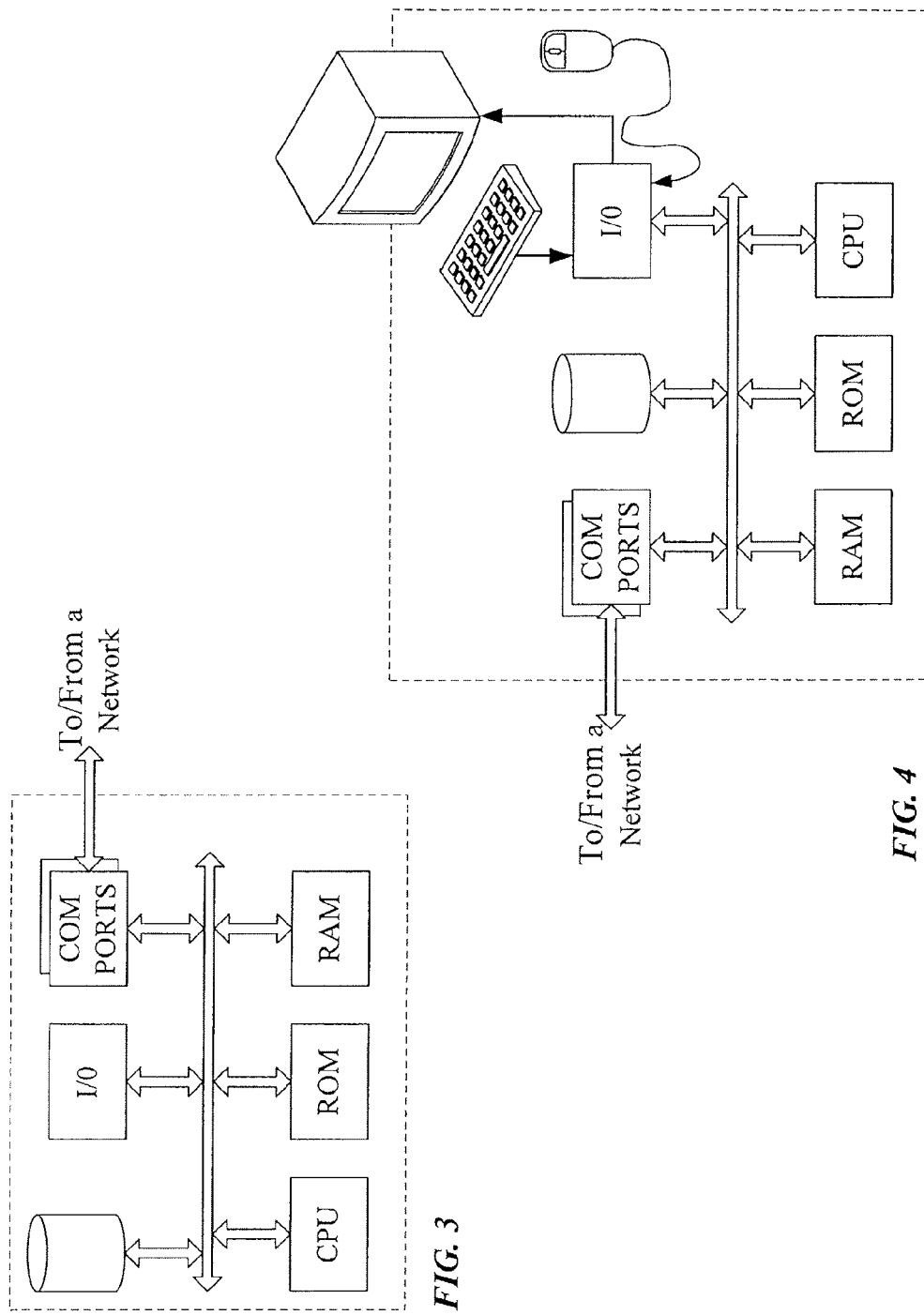
FIG. 3 is a simplified functional block diagram of a computer that may be configured as a host or server.
FIG. 4 is a simplified functional block diagram of a personal computer or other work station or terminal device.

FIGS. 3 and 4 provide functional block diagram illustrations of general purpose computer hardware platforms. FIG. 3 illustrates a network or host computer platform, as may be used to implement a server or other network element (e.g., SMSC 29, GPMD 42 . . . ). FIG. 4 depicts a computer with user interface elements, as may be used to implement a personal computer (PC) or other type of work station or terminal device, although the computer of FIG. 4 may also act as a server if appropriately programmed. It is believed that those skilled in the art are familiar with the structure, programming and general operation of such computer equipment and as a result the drawings should be self-explanatory.

The hardware elements, operating systems and programming languages of such computers are conventional in nature, and it is presumed that those skilled in the art are adequately familiar therewith. Of course, the server functions may be implemented in a distributed fashion on a number of similar platforms, to distribute the processing load.

Hence, aspects of the methods of media content transfer can be executed on, or facilitated with, a mobile station and on a network element such as a server. Program aspects of the technology may be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another computer or processor. For example, previously purchased media content (e.g., an application for backing up contact information, or a ringtone, etc.) can be communicated to a user's mobile station 13 or other mobile station. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the data aggregator, the customer communication system, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data.

Many of these forms of computer readable media may be involved in carrying one or more sequences of one or more instructions to a processor for execution Those skilled in the art will recognize that the present teachings are amenable to a variety of modifications and/or enhancements. For example, although some aspects of the present disclosure describe downloading media content from a network to a mobile station 13, the downloaded media content can also be downloaded from a PC 31 while the end-user is accessing their mobile account information via the customer account web server 41.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX: ACRONYM LIST

The description above has used a large number of acronyms to refer to various services, messages and system components. Although generally known, use of several of these acronyms is not strictly standardized in the art. For the convenience of the reader, the following list correlates terms to acronyms, as used by way of example in the detailed description above.

3GPP2: 3rd generation partnership project 2
AAA: authentication-authorization-accounting
ADS: application download server
API: application programming interface
BREW: binary runtime environment for wireless
BS: base station
BTS: base transceiver system
CDMA: code division multiple access
CD-ROM: compact disc read-only memory
CLNR: certified like-new replacement
DNDA: do not disturb application
DVD: digital video disc
DVD-ROM: digital versatile (video) disc read-only memory
EPROM: erasable programmable read-only memory
EV-DO: evolution-data optimized
ESN: electronic serial number
GPM: group provisioning manager
GPMD: group provisioning manager device
GSM: global system for mobile communications
HLR: home location register
IP: Internet protocol
IR: infrared
LBS: location based services
LCD: liquid crystal display
LDAP: lightweight directory access protocol
LTE: long-term evolution
MC: message center
MDN: mobile directory number
MIN: mobile identification number
MPC: mobile positioning center
MS: mobile station
MSC: mobile switching center
MT: mobile traffic
PC: personal computer
PN: pseudo-random noise
PROM: programmable read-only memory
PSTN: public switched telephone network
RAM: random access memory
RAN: radio access network
RF: radio frequency
SCM: service creation manager
SCMD: service creation manager device
SIF: Standard Interchange Format
SMS: short messaging service
SS7: signaling system 7
STP: signaling transfer points
TCP: transmission control protocol
TDMA: time-division multiple access
UMTS: universal mobile telecommunications system
USB: universal serial bus
VLR: visitor location register
WAN: wide area network
XCVR: transceiver
ZPD: zone provisioning device

What is claimed is:

1. A method, comprising steps of:
receiving a user selection identifying media content among previously purchased mobile station media content associated with the user's mobile account for transfer to a mobile station associated with the user's mobile account;
storing provisioning information with respect to the previously purchased mobile station media content to prepare the identified media content for transmission to the mobile station associated with the user's mobile account;
provisioning a server based on the stored provisioning information, to prepare the identified media content for download to the mobile station, including resetting a price for the identified media content from an amount to a different amount based upon the user having previously purchased the identified media content;
upon completion of the provisioning, transmitting an instruction for downloading the identified media content from the server, the transmitted instruction including an alphanumeric string of an identifier associated with the media content; and
transmitting a download of the identified media content from the server through a mobile communication network to the mobile station in response to detecting user execution of the transmitted instruction.

2. The method of claim 1, further comprising:
providing the user access to information about mobile station media content previously purchased by the user, via an on-line interface to the user's mobile account,
wherein the step of receiving includes receiving a user input of a selection of mobile station media content previously purchased by the user via the on-line interface to the account of the user.

3. The method of claim 1, wherein one or more of the storing, provisioning and transmitting steps are performed upon determining, from the account of the user, that the user is authorized to access the previously purchased mobile station media content.

4. The method of claim 1, wherein the user's mobile account is an account of the user for wireless services provided by the mobile communication network.

5. The method of claim 1, wherein the alphanumeric string of the identifier comprises a keyword.

6. The method of claim 1, wherein the resetting the price includes setting the price for the identified media content from a non-zero amount to zero based upon the user having previously purchased the identified media content.

7. The method of claim 1, wherein the step of transmitting the instruction comprises transmitting a mobile messaging service message containing the instruction through the mobile communication network to the mobile station.

8. The method of claim 1, wherein the step of transmitting the instruction comprises sending the instruction to a Web page associated with the user's mobile station account.

9. The method of claim 1, wherein the download of the identified media content includes one or more of: a software application, a ringtone, music, or video.

10. An apparatus, comprising:
a system of one or more computers; and
a group provisioning manager device (GPMD), a zone provisioning device (ZPD), and an application server implemented on the system, wherein:
the GPMD is configured to receive a user selection identifying media content among previously purchased mobile station media content associated with the user's mobile account for transfer to a mobile station associated with the user's mobile account;
the ZPD is configured to provision the application server based on provisioning information;
the application server is configured to prepare the identified media content for download to the mobile station, responsive to provisioning by the ZPD;
the GPMD is further configured to transmit an instruction for downloading the identified media content from the application server, upon completion of the provisioning, by transmitting a mobile messaging service message containing the instruction through a mobile communication network to the mobile station, the GPMD having a messaging short code assigned thereto, the GPMD being further configured to include the assigned short code in the mobile messaging service message transmitted to the mobile station;
the application server is further configured to transmit a download of the identified media content through the mobile communication network to the mobile station in response to detecting user execution of the transmitted instruction.

11. The apparatus of claim 10, wherein:
the GPMD is further configured to receive a response to the transmitted instruction, from the mobile station, and
the application server is further configured to transmit the download of the identified media content to the mobile station based upon the response received from the mobile station.

12. The apparatus of claim 10, further comprising a web server configured to:
provide the user access to information about mobile station media content previously purchased by the user, via an on-line interface to the user's mobile account; and
receive a user input of a selection of mobile station media content previously purchased by the user via the on-line interface to the account of the user.

13. The apparatus of claim 12, wherein the GPMD is configured to transmit the instruction to a Web page associated with the user's mobile station account.

14. The apparatus of claim 10, further comprising:
an authorization sever,
wherein the GPMD is further configured to query the authorization server to determine whether or not the user is authorized to receive mobile station media content.

15. An article of manufacture comprising:
a non-transitory machine readable medium; and
instructions for execution by a system comprising a computer, wherein execution of the instructions configures the system to perform functions, including functions to:
receive a user selection identifying media content among previously purchased mobile station media content associated with the user's mobile account for transfer to a mobile station associated with the user's mobile account;
store provisioning information with respect to the previously purchased mobile station media content to prepare the identified media content for transmission to the mobile station associated with the user's mobile account;
provision a server based on the stored provisioning information, to prepare the identified media content for download to the mobile station, including resetting a price for the identified media content from an amount to a different amount based upon the user having previously purchased the identified media content;
upon completion of the provisioning, transmit a download instruction, for downloading the identified media content from the server, the transmitted instruction including an alphanumeric string of an identifier associated with the media content; and
transmit a download of the identified media content from the server through a mobile communication network to the mobile station in response to detecting user execution of the transmitted download instruction.

16. The article of claim 15, wherein execution of the instructions configures the system to transmit the download instruction so as to transmit a mobile messaging service message containing the download instruction through the mobile communication network to the mobile station.

17. The article of claim 15, wherein execution of the instructions configures the system to perform the function to transmit the download instruction so as to send the download instruction to a Web page associated with the user's mobile station account.

* * * * *